(12) United States Patent
Duan et al.

(10) Patent No.: US 12,019,841 B2
(45) Date of Patent: Jun. 25, 2024

(54) APPARATUS MANAGEMENT AND CONTROL METHOD AND DEVICE

(71) Applicant: Lenovo (Beijing) Limited, Beijing (CN)

(72) Inventors: Yong Duan, Beijing (CN); Xiao Meng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/178,475

(22) Filed: Mar. 3, 2023

(65) Prior Publication Data

US 2023/0289031 A1 Sep. 14, 2023

(30) Foreign Application Priority Data

Mar. 8, 2022 (CN) .......................... 202210220374.9

(51) Int. Cl.
| | | |
|---|---|---|
| G06F 3/04815 | (2022.01) | |
| G02B 27/01 | (2006.01) | |
| G06F 3/01 | (2006.01) | |
| G06F 3/0486 | (2013.01) | |
| G06F 3/14 | (2006.01) | |
| G06T 7/55 | (2017.01) | |
| G06T 7/70 | (2017.01) | |

(52) U.S. Cl.
CPC ..... *G06F 3/04815* (2013.01); *G02B 27/0179* (2013.01); *G06F 3/012* (2013.01); *G06F 3/0486* (2013.01); *G06F 3/1454* (2013.01); *G06T 7/55* (2017.01); *G06T 7/70* (2017.01); *G02B 2027/0187* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 8,698,771 B2* | 4/2014 | Lee ........................ | G06F 1/1643 345/173 |
| 2018/0122419 A1* | 5/2018 | Wayans ............... | G11B 27/036 |
| 2018/0217678 A1* | 8/2018 | Yun ....................... | G09G 3/3208 |
| 2020/0020136 A1* | 1/2020 | Hwang ................... | G06T 11/00 |

* cited by examiner

*Primary Examiner* — Matthew Yeung
(74) *Attorney, Agent, or Firm* — ANOVA LAW GROUP, PLLC (57) ABSTRACT

An apparatus management and control method includes obtaining an operation position of a target operation of a user at a holographic screen, determining a target apparatus located in a same space as the holographic screen based on the operation position, and controlling the target apparatus based on the target operation.

18 Claims, 4 Drawing Sheets

APPARATUS MANAGEMENT AND CONTROL METHOD AND DEVICE

CROSS-REFERENCE TO RELATED APPLICATION

This application claims priority to Chinese Patent Application No. 202210220374.9, filed on Mar. 8, 2022, the entire content of which is incorporated herein by reference.

TECHNICAL FIELD

The present disclosure relates to the holographic teaching field and, more particularly, to an apparatus management and control method and a device.

BACKGROUND

A holographic screen allows a viewer to see both an image projected onto a screen by a projector and an object behind the holographic screen.

With the development of the holographic screen, a user wants to interact with another device in the same space with the holographic projection image to improve the interactivity of the holographic projection device. However, management and control of the existing visualization apparatus need to be controlled by selecting a corresponding apparatus on the screen or the graphical interface, which affects the user experience and the quality of interaction of the user.

SUMMARY

Embodiments of the present disclosure provide an apparatus management and control method. The method includes obtaining an operation position of a target operation of a user at a holographic screen, determining a target apparatus located in a same space as the holographic screen based on the operation position, and controlling the target apparatus based on the target operation.

Embodiments of the present disclosure provide an apparatus management and control device, including a first acquisition module, a first determination module, and a management and control module. The first acquisition module is configured to obtain an operation position of a target operation of a user on a holographic screen. The first determination module can be configured to determine a target apparatus located in a same space as the holographic screen based on an operation position. The management and control module can be configured to control the target apparatus based on the target operation.

Embodiments of the present disclosure provide a non-transitory computer-readable storage medium storing a program that, when executed by a processor, causes the processor to obtain an operation position of a target operation of a user at a holographic screen, determine a target apparatus located in a same space with the holographic screen based on the operation position, and control the target apparatus based on the target operation.

DETAILED DESCRIPTION OF THE EMBODIMENTS

To make the objects, technical solutions, and advantages of embodiments of the present disclosure clearer, the technical solutions of embodiments of the present disclosure are described in detail below with reference to the accompanying drawings of embodiments of the present disclosure. Embodiments of the present disclosure are intended to illustrate the present disclosure but are not intended to limit the scope of the present disclosure.

In the following description, "some embodiments" can describe a subset of all possible embodiments. However, "some embodiments" can be a same subset or different subsets of all possible embodiments and can be combined with each other without conflict.

In the following description, the related term "first\second\third" is only to distinguish similar objects and does not represent a particular order of the objects. "first\second\third" can be interchanged with specific orders or sequences when allowed. Thus, embodiments of the present disclosure described here can be implemented in another order than the order shown or described here.

Unless defined otherwise, all technical and scientific terms used here have the same meaning as commonly understood by those of ordinary skill in the art to which the present disclosure belongs. The terms used here are used for the purpose of describing embodiments of the present disclosure only and are not intended to limit the present disclosure.

Figure 1:
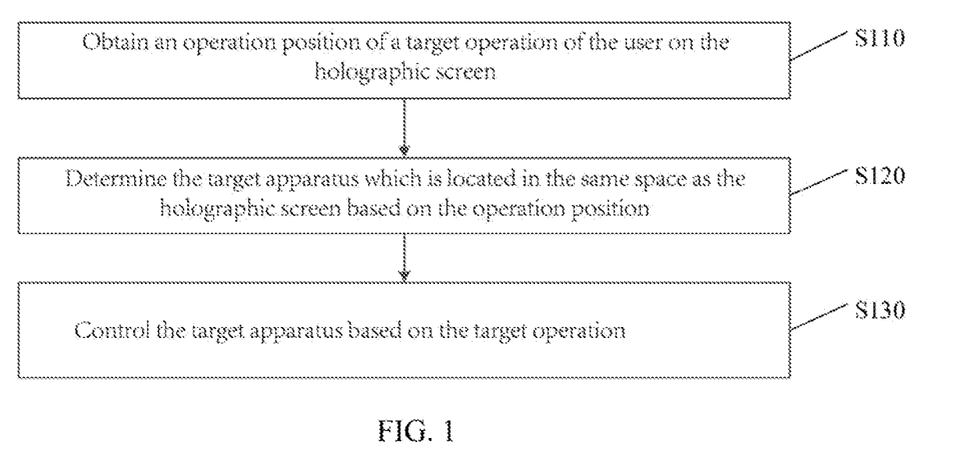
FIG. 1 illustrates a schematic flowchart of an apparatus management and control method according to some embodiments of the present disclosure.

As shown in FIG. 1, embodiments of the present disclosure provide an apparatus management and control method. The method includes the following processes.

At S110, an operation position of a target operation of the user is obtained on the holographic screen.

The holographic screen can be a transparent screen. For example, the holographic screen can be arranged in a classroom environment. A teacher can display a to-be-displayed teaching content on the holographic screen. Moreover, due to the transparent property of the holographic screen, the teacher can also see through the holographic screen and see an apparatus in the classroom environment on the other side of the holographic screen and students watching the holographic screen.

In an implementation process, the user can touch the holographic screen by using a finger or other members of the body to perform the target operation on the holographic screen. The user can also click the holographic screen through a teaching rod or another teaching aid to perform the target operation on the holographic screen. The form of performing the target operation by the user is not limited.

When the user performs an operation on the holographic screen, the operation position of the user on the holographic screen can be obtained. For example, when the user clicks the holographic screen with a finger, the position where the finger clicks on the holographic screen can be obtained. When the user uses the teaching rod to click the holographic screen, the position of the holographic screen clicked by the teaching rod can be obtained. The operation position can be described by a spatial coordinate system or can be described by a pixel position on the hologram screen.

At S120, the target apparatus which is located in the same space as the holographic screen is determined based on the operation position.

The target apparatus located in the same space as the hologram screen can be an apparatus seen by the user through the hologram screen. For example, the holographic screen can be arranged in the classroom environment. The teacher can see lights, air conditioners, speakers, seats, other large screens in the classroom, and terminal apparatuses used by the students through the holographic screen, During practice, the user can see the apparatus behind the screen through the holographic screen and click on the position of the apparatus seen on the holographic screen to determine the target apparatus. That is, the target apparatus can be determined based on the operation position of the user on the holographic screen. For example, the teacher can see other large screens in the classroom through the holographic screen, and then the teacher can click on the holographic screen to see the positions of the other large screens. That is, the target apparatus can be determined to be the large screen corresponding to clicking.

At S130, the target apparatus is controlled based on the target operation.

In some embodiments, the target apparatus can be controlled based on the operation of clicking the holographic screen. For example, on/off of holographic screen management lights can be clicked. The holographic screen can be clicked to control on/off of the terminal seen through the holographic screen. The holographic screen can also be clicked to control the students seen to transfer contents made by the students on education tablets to the holographic screen to be displayed.

In some embodiments, when the operation of the target apparatus has a diversity characteristic, the clicking cannot satisfy all apparatus management and control scenarios. The user needs to perform an operation on the target apparatus again to achieve different scenarios of controlling the apparatus. For example, when the brightness of the light needs to be adjusted, when the volume of the speaker needs to be adjusted, the adjustment operation of the user needs to be obtained to adjust the brightness of the lights and adjust the volume of the speaker.

In embodiments of the present disclosure, firstly, the operation position of the target operation of the user on the holographic screen can be obtained. Then, the target apparatus which is located in the same space as the holographic screen can be determined based on the operation position. Then, based on the target operation, the target apparatus can be controlled. Therefore, the target apparatus which is located in the same space as the holographic screen can be controlled by using the holographic screen to improve the user experience and the interaction effect of the user.

In some embodiments, determining the target apparatus located in the same space as the holographic screen based on the operation position can be implemented by the following processes.

At 121, a line of sight position of the user is obtained.

In some embodiments, a tracking camera arranged behind the user can be configured to track the position of the user and the direction of the head of the user and collect an image to determine the sight position of the user. A camera arranged at the holographic screen can be configured to collect an image of the position of the user and the direction of the head of the user to determine the line of sight position of the user. The line of sight position can be described by a coordinate of a 3-dimensional coordinate system.

In process 122, an apparatus position of the apparatus located in the same space as the holographic screen can be matched based on the operation position and the line of sight position to determine the target apparatus.

In some embodiments, the operation position and the line of sight position can be connected to form a ray in the space, and the ray can point to the apparatus behind the holographic screen. The ray can be matched with the apparatus position of the apparatus in the same space as the holographic screen. That is, a first apparatus intersected with the ray can be determined as the target apparatus.

In embodiments of the present disclosure, the line of sight position of the user can be obtained first. Then, the apparatus position of the apparatus that is in the same space as the holographic screen can be matched based on the operation position and the line of sight position to determine the target apparatus. Thus, the operation position of the user, the line of sight position of the user, and the apparatus position of the apparatus that is in the same space as the holographic screen can be matched to effectively determine the target apparatus pointed by the user.

Figure 2:
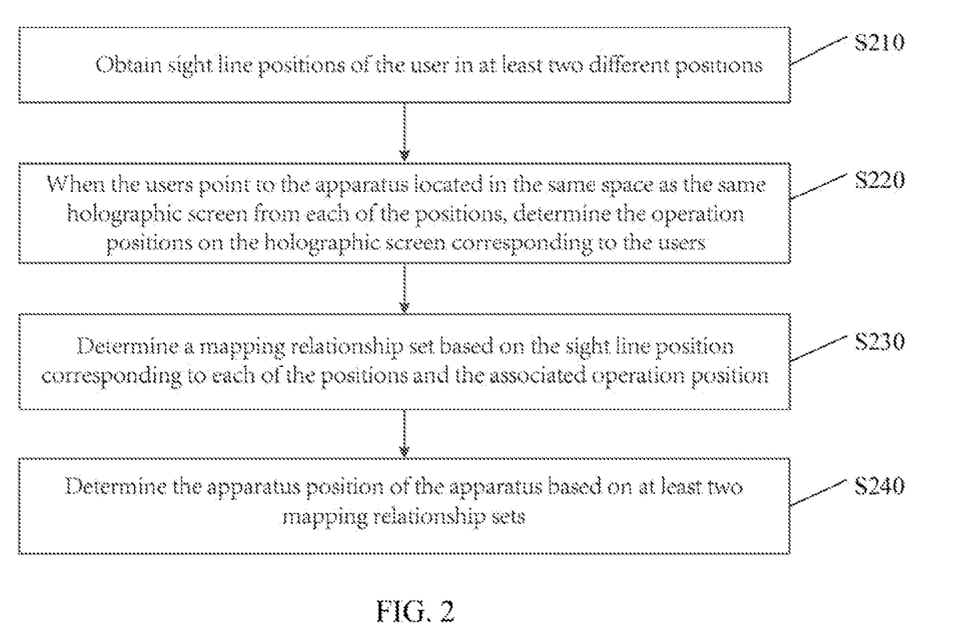
FIG. 2 illustrates a schematic flowchart of a method of obtaining an apparatus position according to some embodiments of the present disclosure.

In some embodiments, as shown in FIG. 2, before obtaining the operation position of the target operation of the user on the holographic screen, obtaining the apparatus position of the apparatus that is located in the same space as the holographic screen includes the following processes.

At S210, line of sight positions of the user at least two different positions are obtained.

Figure 3:
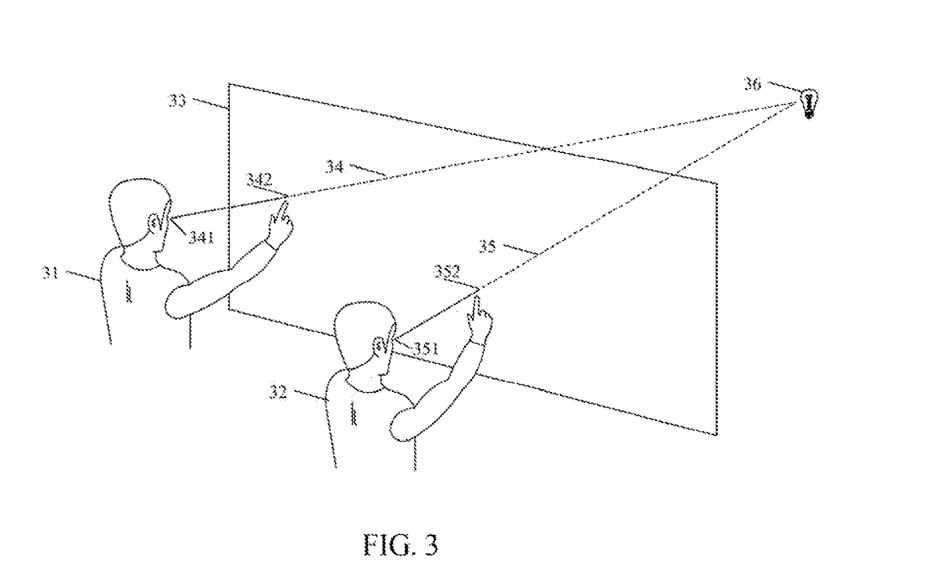
FIG. 3 illustrates a schematic spatial diagram of determining an apparatus position according to some embodiments of the present disclosure.

FIG. 3 illustrates a schematic spatial diagram of determining an apparatus position according to some embodiments of the present disclosure. FIG. 3 shows a user 31, a user 32, a holographic screen 33, a ray 34, a ray 35, and a lamp 36.

The user 31 and the user 32 can be a same user or different users. The user 31 and the user 32 may need to face the holographic screen 33. The user 31 and the user 32 can be located at different positions.

In some embodiments, the line of sight position 341 of the user 31 and the line of sight position 351 of the user 32 need to be obtained.

At S220, when the users point to the apparatus located in the same space with the same holographic screen from each of the positions, the operation positions at the holographic screen corresponding to the users are determined.

As shown in FIG. 3, when both the user 31 and the user 32 point to the lamp 36 through the hologram screen 33, an operation point at the holographic screen 33 corresponding to the user 31 is 342, and an operation point at the holographic screen 33 corresponding to the user 32 is 352.

At S230, a mapping relationship set is determined based on the line of sight position corresponding to each of the positions and the associated operation position.

As shown in FIG. 3, the ray 34 is determined based on the line of sight position 341 of the user 31 and the associated operation position 342. The ray 35 is determined based on the line of sight position 351 of the user 32 and the associated operation position 352.

At S240, the apparatus position of the apparatus is determined based on at least two mapping relationship sets.

As shown in FIG. 3, based on the ray 34 and the ray 35, an intersection position is determined as the apparatus position of the apparatus (lamp) 36. In some embodiments, two clicks can result in an intersection of the ray 34 and the ray 35 (but not necessarily strictly intersected with each other) in space. A closest position of the two rays in the space can be used as the spatial position of the lamp 36.

In some embodiments, positions of a plurality of to-be-controlled apparatuses that are in the same space with the holographic screen can be determined one by one through the above steps.

In some embodiments, the user can also click on the holographic screen through a plurality of different positions to determine the position of the apparatus. For example, in a holographic classroom, a teacher can click on the same apparatus behind the holographic screen at a plurality of positions and angles to perform modeling on the position of the apparatus. The position of the apparatus can be determined by averaging the plurality of clicks to improve the accuracy of the apparatus position.

In embodiments of the present disclosure, the line of sight positions of the user in at least two different positions can be obtained first. Then, the operation positions at the holographic screen corresponding to the users can be determined when the users point to the apparatus located in the same space with the holographic screen from each of the positions. Based on the line of sight position corresponding to each of the positions and the associated operation position, the mapping relationship set can be determined. Then, based on at least two mapping relationship sets, the apparatus position of the apparatus can be determined. Thus, the user may only need to click on the apparatus whose position is to be determined at different positions in advance to determine the position of the apparatus. The method of determining the position can be easy.

In some embodiments, obtaining the line of sight positions of the users in at least two different positions can include the following processes.

At 211, at least two depth images corresponding to the users in at least two different positions are collected.

In some embodiments, the depth images can be obtained using a time of flight (TOF) camera. That is, continuous near-infrared pulses can be transmitted to the target scene, and then the light pulses reflected back by the object can be received by a sensor. By comparing a phase difference between the emitted light pulse and the light pulse reflected by the object, the transmission delay between the light pulses can be calculated to further obtain the distance between the object and the emitter and eventually obtain a depth image.

The depth image can be collected by utilizing a somatosensory apparatus Kinect that combines a color image and a depth image.

At 212, the line of sight positions of the users in at least two different positions are determined based on the at least two depth images.

Here, since the depth image includes distance information of an object in the image, the line of sight position of the user can be determined based on the depth image.

In some embodiments, one camera device configured to obtain the depth image can be arranged to collect the depth images at the two different positions. In some other embodiments, a plurality of camera devices configured to obtain the depth images can be arranged to collect the depth images to improve the accuracy of the line of sight position of the user determined by the depth images.

In embodiments of the present disclosure, the at least two depth images corresponding to the users at the at least two different positions can be collected first. Then, the line of sight positions of the users at the at least two different positions can be determined based on the at least two depth images. Thus, the line of sight positions of the users can be effectively determined based on the depth images.

Figure 4A:
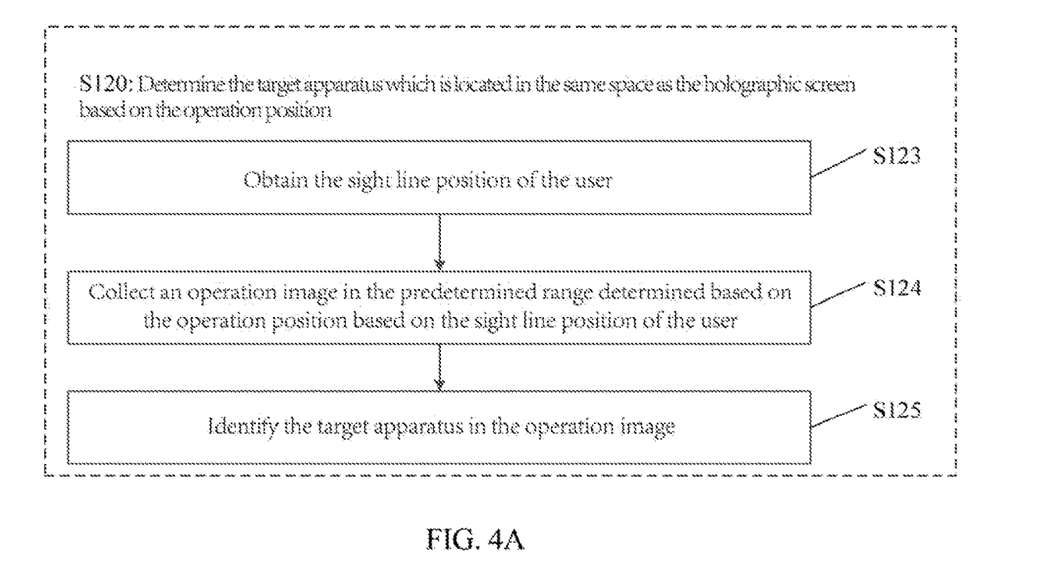
FIG. 4A illustrates a schematic flowchart of a method of obtaining a target apparatus according to some embodiments of the present disclosure.

In some embodiments, as shown in FIG. 4A, determining the target apparatus located in the same space with the holographic screen based on the operation position includes the following processes.

At S123, the line of sight position of the user is obtained.

Figure 4B:
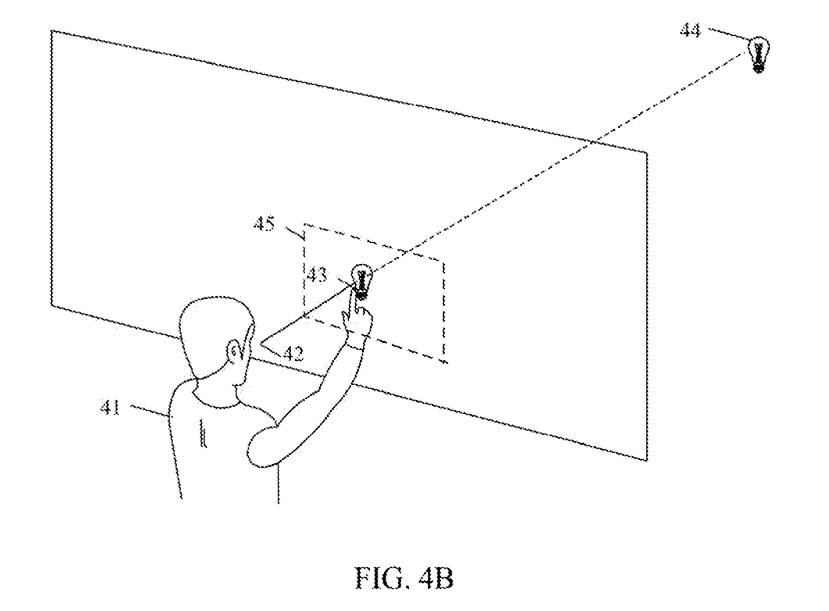
FIG. 4B illustrates a schematic spatial diagram of determining a target apparatus according to some embodiments of the present disclosure.

FIG. 4B illustrates a schematic spatial diagram of determining a target apparatus according to some embodiments of the present disclosure. FIG. 4B shows a user 41, a line of sight position 42 of the user, a position 43 of a lamp pointed by the user at the holographic screen, a position 44 of an actual lamp, and a predetermined range 45 determined based on the position 43 of the lamp pointed by the user at the holographic screen.

In some embodiments, since the line of sight angles of the users are different, images seen by the users can be determined to be different on the holographic screen. Thus, the line of sight position of the user needs to be obtained first.

At S124, an operation image in the predetermined range determined based on the operation position is collected based on the line of sight position of the user.

In some embodiments, based on the line of sight position of the user, the camera can be configured to track a turning direction of the head of the user and collect the operation image in the predetermined range determined based on the operation position.

In some embodiments, the predetermined range can be set based on a size of the apparatus, and the operation image within the predetermined range determined based on the operation position can be collected. For example, an operation image of the predetermined range 45 in FIG. 4B is obtained.

At S125, the target apparatus is identified in the operation image.

Here, since the operation image determined based on the operation position is collected based on the line of sight position of the user, the operation image can include the target apparatus. The target apparatus can be identified in an image identification method.

In embodiments of the present disclosure, the line of sight position of the user can be obtained first. Then, the operation image in the predetermined range determined based on the operation position can be collected. Then, the target apparatus can be identified in the operation image. Thus, the operation image including the target apparatus can be collected, and the target apparatus can be then effectively identified based on the operation image.

In some embodiments, the target operation can include a drag operation. The target apparatus can include a terminal apparatus having a screen. Controlling the target apparatus based on the target operation can include the following processes.

At 131, based on the drag operation, a display content of the terminal apparatus is displayed on the holographic screen.

In some embodiments, the display content of the terminal apparatus can be displayed on the holographic screen through the dragging operation or another identification operation. For example, the holographic screen can be arranged in a classroom environment, a teacher can drag any terminal apparatus used by a student to display the display content of the terminal apparatus on the holographic screen.

In some other embodiments, at 132, the display content of the holographic screen is displayed at the screen of the terminal apparatus based on the drag operation.

In some embodiments, the display content of the holographic screen can be displayed on the screen of the terminal apparatus through the drag operation or another identification operation. For example, the holographic screen can be arranged in the classroom environment. The teacher can drag the display content of the holographic screen to a terminal apparatus used by any student through the drag operation to display the display content of the holographic screen at the terminal apparatus.

In some embodiments, a document, an image, or a video of the holographic screen can be displayed through the drag operation. The dragged document, image, or video can be transmitted to the terminal apparatus.

In embodiments of the present disclosure, the display content of the terminal apparatus can be displayed at the holographic screen based on the drag operation, or the display content of the holographic screen can be displayed at the screen of the terminal apparatus based on the drag operation. Thus, the contents of the holographic screen and the terminal apparatus can be displayed interactively to improve user experience and an interactive effect of the user.

In some embodiments, controlling the target apparatus based on the target operation can include the following processes.

At 133, a functional icon corresponding to the target apparatus is displayed on the holographic screen based on the target apparatus.

Figure 4C:
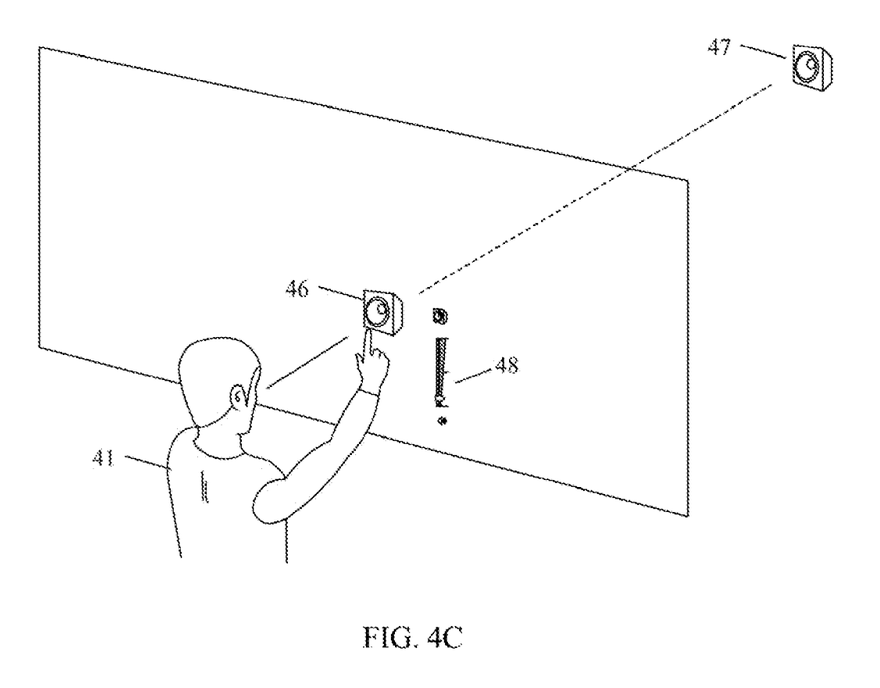
FIG. 4C illustrates a schematic spatial diagram of adjusting a volume of a speaker according to some embodiments of the present disclosure.

FIG. 4C is a schematic spatial diagram of adjusting the sound volume of a sound box according to an embodiment of the present disclosure. FIG. 4C shows the user 41, a position where the user points to the sound box 46 at the holographic screen, a position 47 of an actual sound box, and a function icon 48 used to adjust the sound volume at the holographic screen.

As shown in FIG. 4C, based on the apparatus pointed by the user being the sound box 46, a function icon 48 corresponding to the sound box used to adjust the volume is displayed on the holographic screen.

In some embodiments, a corresponding function icon can be displayed based on the functions of the target apparatus. For example, when the target apparatus is a light, a functional icon used to adjust the brightness of the light can be displayed. When the target apparatus is an air conditioner, a functional icon used to adjust the temperature or an air amount of the air conditioner can be displayed.

At 134, a functional operation of the user based on the functional icon is obtained.

In some embodiments, the user can perform the corresponding functional operation based on the displayed functional icon. As shown in FIG. 4C, the user can perform a sound box volume adjustment operation based on the functional icon 48.

At 135, the target apparatus is controlled based on the functional operation.

In some embodiments, the target apparatus can be controlled based on the functional operation. As shown in FIG. 4C, the sound box volume adjustment operation is obtained based on the functional icon 48. The volume of the sound box can be adjusted based on the operation.

In embodiments of the present disclosure, the functional icon corresponding to the target apparatus can be displayed on the holographic screen based on the target apparatus. Then, the functional operation of the user based on the functional icon can be obtained. Then, the target apparatus can be controlled based on the functional operation. Thus, the functional icon corresponding to the target apparatus can be displayed on the holographic screen to realize the functional operation based on the functional icon. Thus, the target apparatus can be controlled to satisfy various operation requirements of the user for the target apparatus.

In some embodiments, controlling the target apparatus based on the target operation can include the following processes.

At 136, a gesture operation of the user for the target apparatus is obtained.

In some embodiments, obtaining the gesture operation can include obtaining a gesture posture of the user in the air. For example, the user can wave hands upward or downward in the air.

At 137, the target apparatus is controlled based on the gesture operation.

In some embodiments, the target apparatus can be controlled when the user waves a hand upward or downward in the air. For example, the user can wave the hand downward to turn down the volume of the sound box. The user can wave the hand upward to turn up the volume of the sound box.

In embodiments of the present disclosure, the gesture operation of the user on the target apparatus can be obtained. Then, the target apparatus can be controlled based on the gesture operation. Therefore, the target apparatus can be controlled based on the gesture operation of the user.

In some embodiments, controlling the target apparatus based on the target operation can include the following processes.

At 138, the target apparatus can be connected with an internet of things (IOT) control function corresponding to the target apparatus.

Here, the target apparatus can be connected with the IOT control function at a backend of the target apparatus. Thus, the target apparatus can be controlled based on the IOT.

At 139, based on the target operation, the target apparatus is controlled by using the IOT control function corresponding to the target apparatus.

Here, the target operation can also interact with the IOT control function of the apparatus to control the target apparatus based on the target operation using the IOT control function.

In embodiments of the present disclosure, the target apparatus can be connected with the IOT control function corresponding to the target apparatus first. Then, based on the target operation, the target apparatus can be controlled by using the IOT control function corresponding to the target apparatus. Therefore, the target operation can interact with the IOT control function to effectively control the target apparatus.

Based on the above embodiments, embodiments of the present disclosure provide an apparatus management and control device. The device can include modules, and the modules can include sub-modules, which can be implemented by a processor in an electronic apparatus or a specific logic circuit. In some embodiments, the processor can include a central processing unit (CPU), a microprocessor (MPU), a digital signal processor (DSP), or a field programmable gate array (FPGA).

Figure 5:
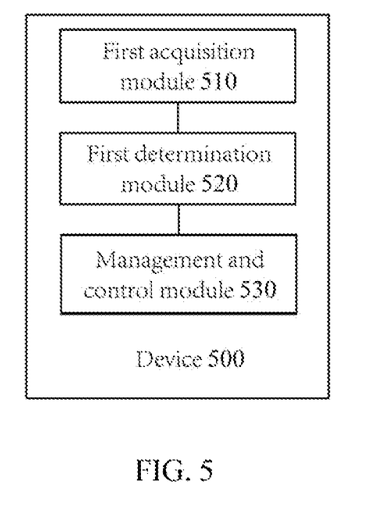
FIG. 5 illustrates a schematic structural diagram of an apparatus management control device according to some embodiments of the present disclosure.

FIG. 5 illustrates a schematic structural diagram of an apparatus management control device 500 according to some embodiments of the present disclosure. As shown in FIG. 5, the device 500 includes a first acquisition module 510, a first determination module 520, and a management and control module 530.

The first acquisition module 510 can be configured to obtain the operation position of the target operation of the user at the holographic screen.

The first determination module 520 can be configured to determine the target apparatus located in the same space with the holographic screen based on the operation position.

The management and control module 530 can be configured to control the target apparatus based on the target operation.

In some embodiments, the first determination module can include a first acquisition sub-module and a matching sub-module. The first acquisition sub-module can be configured to obtain the line of sight position of the user. The matching sub-module can be configured to match the apparatus position of the apparatus located in the same space with the holographic screen based on the operation position and the line of sight position to determine the target apparatus.

In some embodiments, the device can further include an acquisition module, a second determination module, a third determination module, and a fourth determination module. The acquisition module can be configured to obtain the line of sight positions of the users at the at least two different positions. The second determination module can be configured to determine the operation positions at the holographic screen corresponding to the users when the users point to the apparatus that is in the same space with the same holographic screen at each of the positions. The third determination module can be configured to determine a mapping relationship set based on the line of sight position and the associated operation position corresponding to each of the positions. The fourth determination module can be configured to determine the apparatus position of the apparatus based on at least two mapping relationship sets.

In some embodiments, the acquisition module can include a collection sub-module and a fourth determination sub-module. The collection sub-module can be configured to collect the at least two depth images corresponding to the users located at the at least two different positions. The fourth determination sub-module can be configured to determine, based on the at least two depth images, the line of sight positions of the users at the at least two different positions.

In some embodiments, the first determination module can include an acquisition unit, a determination unit, and an identification unit. The acquisition unit can be configured to obtain the line of sight position of the user. The determination unit can be configured to collect the operation image in the predetermined range determined based on the operation position based on the line of sight position of the user. The identification unit can be configured to identify the target apparatus in the operation image.

In some embodiments, the target operation can include the drag operation. The target apparatus can include the terminal apparatus having the screen. The management and control module can include a first display sub-module and a second display sub-module. The first display sub-module can be configured to display the display content of the terminal apparatus at the holographic screen based on the drag operation. The second display sub-module can be configured to display the display content of the holographic screen at the screen of the terminal apparatus based on the drag operation.

In some embodiments, the management and control module can include a display sub-module, a second acquisition sub-module, and a first management and control sub-module. The display sub-module can be configured to display the functional icon corresponding to the target apparatus at the holographic screen based on the target apparatus. The second acquisition sub-module can be configured to obtain the functional operation of the user based on the functional icon. The first management and control sub-module can be configured to control the target apparatus based on the functional operation.

In some embodiments, the management and control module can include a third acquisition sub-module and a second management and control sub-module. The third acquisition sub-module can be configured to obtain the gesture operation of the user on the target apparatus. The second management and control sub-module can be configured to control the target apparatus based on the gesture operation.

In some embodiments, the management and control module can include a connection sub-module and a third management and control sub-module. The connection sub-module can be configured to connect the target apparatus with the IOT control function corresponding to the target apparatus. The third control sub-module can be configured to control the target apparatus by using the IOT control function corresponding to the target apparatus based on the target operation.

The above description of apparatus embodiments is similar to the above description of method embodiments and has similar beneficial effects as the method embodiments. For technical details not disclosed in the apparatus embodiments of the present disclosure, reference can be made to the description of the method embodiments of the present disclosure.

In embodiments of the present disclosure, if the method is implemented in a form of a software functional module and sold or used as a standalone product, the method can also be stored in a computer-readable storage medium. Based on this understanding, the essence of the technical solutions of embodiments of the present disclosure or the part of the technical solutions that contributes to the existing technology can be embodied in the form of a software product. The computer software product can be stored in a storage medium and include a plurality of instructions to cause the electronic apparatus (e.g., a cellphone, a tablet, a laptop, a desktop, etc.) to execute all or a part of the method of embodiments of the present disclosure. The storage medium can include various media capable of storing program codes, such as a flash disk, a removable hard disk, a read-only memory (ROM), a magnetic disk, or an optical disk. Thus, embodiments of the present disclosure are not limited to any specific combination of hardware and software.

Correspondingly, embodiments of the present disclosure provide a storage medium. The storage medium can store a computer program that, when the computer program is executed by a processor, causes the processor to implement the steps in the apparatus management and control method of embodiments of the present disclosure.

Figure 6:
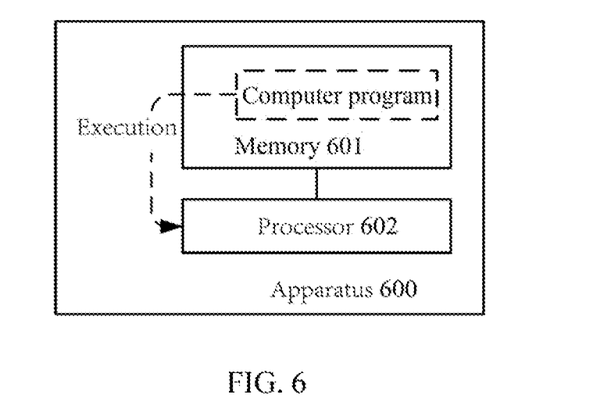
FIG. 6 illustrates a schematic diagram of an electronic apparatus according to some embodiments of the present disclosure.

Correspondingly, embodiments of the present disclosure provide an electronic apparatus. FIG. 6 illustrates a schematic diagram of an electronic apparatus 600 according to some embodiments of the present disclosure. As shown in FIG. 6, the hardware entity of the apparatus 600 includes a memory 601 and a processor 602. The memory 601 stores a computer program executable by the processor 602 that, when executed by the processor 602, causes the processor 602 to realize the steps of the apparatus management and control method of embodiments of the present disclosure.

The Memory 601 can be used to store instructions and applications executable by the processor 602 and also buffer data (e.g., image data, audio data, voice communication data, and video communication data) to be processed or already processed by the processor 602 and the modules of the electronic apparatus 600. The memory 601 can include a flash memory (FLASH) or a random access memory (RAM).

Here, the above description of the storage medium and apparatus embodiments can be similar to the description of the above method embodiments and have similar beneficial effects as the method embodiments. For technical details not disclosed in the storage medium and apparatus embodiments of the present disclosure, reference can be made to the description of the method embodiments of the present disclosure.

"One embodiment" or "an embodiment" mentioned in the specification can mean that a particular feature, structure, or characteristic related to embodiments of the present disclosure can be included in at least one embodiment of the present disclosure. Thus, the phrases "in one embodiment" or "in an embodiment" mentioned in various places throughout this specification are not necessarily all referring to the same embodiment. Furthermore, the particular feature, structure, or characteristic can be combined in any suitable manner in one or more embodiments. In various embodiments of the present disclosure, the sequence numbers of the above processes do not mean the execution sequence. The execution sequence of the processes can be determined by the function and inherent logic of the processes and should not be intended to limit the implementation process of embodiments of the present disclosure. The above sequence numbers of embodiments of the present disclosure are merely for description and do not represent advantages and disadvantages of embodiments of the present disclosure.

In the specification, the terms "comprising," "including," or any other variation thereof, are intended to cover a non-exclusive inclusion, such that a process, method, article, or apparatus that includes a list of elements does not include only those elements but can include other elements not expressly listed or inherent to such process, method, article, or apparatus. Without further limitation, an element defined by the phrase "comprising an . . . " does not exclude the presence of other similar elements in the process, method, article, or apparatus that includes the element.

In some embodiments of the present disclosure, the disclosed apparatus and method can be implemented in other manners. The above apparatus embodiments are merely illustrative. For example, the division of the unit can be only a logical functional division. The unit can be divided in another manner in actual implementation. For example, a plurality of units or assemblies can be combined or integrated into another system, or some features can be omitted or not implemented. In addition, the coupling, direct coupling, or communication connection between the components shown or discussed can be formed through some interfaces. The indirect coupling or communication connection between the apparatuses or units can be electrical, mechanical, or in other forms.

The units described as separate parts may or may not be physically separate. The parts displayed as units may or may not be physical units and can be located in one place or distributed at a plurality of network units. Some or all of the units can be selected according to actual needs to realize the purpose of the solution of embodiments of the present disclosure.

In addition, all functional units of embodiments of the present disclosure can be integrated into one processing unit or each unit can be separately regarded as one unit, or two or more units can be integrated into one unit. The integrated unit can be realized in a form of hardware or in a form of hardware with a software functional unit.

Those of ordinary skill in the art can understand that all or part of the steps for realizing the method embodiments can be completed by hardware related to program instructions. The above program can be stored in the computer-readable storage medium. When the program is executed, the processor can be configured to execute the processes of the method embodiments. The storage medium can include various media that can store program codes, such as a removable memory device, a read-only memory (ROM), a magnetic disk, or an optical disk.

In some other embodiments, if the method is implemented in a form of a software functional module and sold or used as a standalone product, the method can also be stored in a computer-readable storage medium. Based on this understanding, the essence of the technical solutions of embodiments of the present disclosure or the part of the technical solutions that contributes to the existing technology can be embodied in the form of a software product. The computer software product can be stored in a storage medium and include a plurality of instructions to cause the electronic apparatus (e.g., a cellphone, a tablet, a laptop, a desktop, etc.) to execute all or a part of the method of embodiments of the present disclosure. The storage medium can include various media capable of storing program codes, such as a flash disk, a removable hard disk, a read-only memory (ROM), a magnetic disk, or an optical disk. Thus, embodiments of the present disclosure are not limited to any specific combination of hardware and software.

The methods disclosed in several method embodiments of the present disclosure can be combined arbitrarily when there is no conflict to obtain new method embodiments.

Features disclosed in several product embodiments of the present disclosure can be combined in any combination when there is no conflict to obtain new product embodiments.

The features disclosed in several method or apparatus embodiments of the present disclosure can be combined in any combination when there is no conflict to obtain new method or apparatus embodiments.

The above description is only some embodiments of the present disclosure, but the scope of the present disclosure is not limited to this. Those skilled in the art can easily think of changes or substitutions within the technical scope of the present disclosure, and the changes or substitutions shall be within the scope of the present disclosure. Therefore, the scope of the present invention shall be subject to the scope of the claims.

What is claimed is:

1. An apparatus management and control method comprising:
   obtaining an operation position of a target operation of a user at a holographic screen, the target operation including a drag operation;
   determining a target apparatus located in a same space as the holographic screen based on the operation position; and controlling the target apparatus based on the target operation, including:
    based on the drag operation, displaying, on the holographic screen, a display content that is displayed by a screen of the terminal apparatus; or
    based on the drag operation, displaying, on the screen of the terminal apparatus, a display content that is displayed by the holographic screen.

2. The method of claim 1, wherein determining the target apparatus located in the same space with the holographic screen based on the operation position includes:
    obtaining a line of sight position of a user; and
    matching an apparatus position of an apparatus located in the same space with the holographic screen based on the operation position and the line of sight position to determine the target apparatus.

3. The method of claim 2, further comprising, before obtaining the operation position of the target operation of the user at the holographic screen:
    obtaining line of sight positions of the user at at least two different positions;
    determining the operation position at the holographic screen corresponding to the user when the user points to the apparatus in the same space with the same holographic screen at each of the positions;
    determining a mapping relationship set based on the line of sight position and associated operation position corresponding to each of the positions; and
    determining the apparatus position of the apparatus based on at least two mapping relation sets.

4. The method of claim 3, wherein obtaining the line of sight positions of the user at the at least two different positions includes:
    collecting at least two depth images corresponding to the user located at the at least two different positions; and
    determining the line of sight positions of the user at the at least two different positions based on the at least two depth images.

5. The method of claim 1, wherein determining the target apparatus located in the same space with the holographic screen based on the operation position includes:
    obtaining a line of sight position of the user;
    collecting an operation image in a predetermined range determined based on the operation position based on the line of sight position of the user; and
    identifying the target apparatus in the operation image.

6. The method of claim 1, wherein controlling the target apparatus based on the target operation includes:
    displaying a functional icon corresponding to the target apparatus on the holographic screen based on the target apparatus;
    obtaining a functional operation of the user based on the functional icon; and
    controlling the target apparatus based on the functional operation.

7. The method of claim 1, wherein controlling the target apparatus based on the target operation includes:
    obtaining a gesture operation of the user on the target apparatus; and
    controlling the target apparatus based on the gesture operation.

8. The method of claim 1, wherein controlling the target apparatus based on the target operation includes:
    connecting the target apparatus with an internet of things (IOT) control function corresponding to the target apparatus; and
    based on the target operation, controlling the target apparatus by using the IOT control function corresponding to the target apparatus.

9. An apparatus management and control device, comprising:
    a first acquisition module configured to obtain an operation position of a target operation of a user at a holographic screen, the target operation including a drag operation;
    a first determination module configured to determine a target apparatus located in a same space as the holographic screen based on an operation position; and
    a management and control module configured to control the target apparatus based on the target operation, wherein controlling the target apparatus based on the target operation includes:
        based on the drag operation, displaying, on the holographic screen, a display content that is displayed by a screen of the terminal apparatus; or
        based on the drag operation, displaying, on the screen of the terminal apparatus, a display content that is displayed by the holographic screen.

10. The device of claim 9, wherein the first determination module is further configured to:
    obtain a line of sight position of a user; and
    match an apparatus position of an apparatus located in the same space with the holographic screen based on the operation position and the line of sight position to determine the target apparatus.

11. The device of claim 10, further comprising an acquisition module configured to:
    obtain line of sight positions of the user at at least two different positions;
    determine the operation position at the holographic screen corresponding to the user when the user points to the apparatus in the same space with the same holographic screen at each of the positions;
    determine a mapping relationship set based on the line of sight position and associated operation position corresponding to each of the positions; and
    determine the apparatus position of the apparatus based on at least two mapping relation sets.

12. The device of claim 11, wherein the acquisition module further includes a collection sub-module configured to:
    collect at least two depth images corresponding to the user located at the at least two different positions; and
    determine the line of sight positions of the user at the at least two different positions based on the at least two depth images.

13. The device of claim 9, wherein the first determination module is configured to:
    obtain a line of sight position of the user;
    collect an operation image in a predetermined range determined based on the operation position based on the line of sight position of the user; and
    identify the target apparatus in the operation image.

14. The device of claim 9, wherein the management and control module is further configured to:
    display a functional icon corresponding to the target apparatus on the holographic screen based on the target apparatus;
    obtain a functional operation of the user based on the functional icon; and
    control the target apparatus based on the functional operation.

15. The device of claim 9, wherein the management and control module is further configured to:
- obtain a gesture operation of the user on the target apparatus; and
- control the target apparatus based on the gesture operation.

16. The device of claim 9, wherein the management and control module is further configured to:
- connect the target apparatus with an internet of things (IOT) control function corresponding to the target apparatus; and
- based on the target operation, control the target apparatus by using the IOT control function corresponding to the target apparatus.

17. A non-transitory computer-readable storage medium storing a program that, when executed by a processor, causes the processor to:
- obtain an operation position of a target operation of a user at a holographic screen, the target operation including a drag operation;
- determine a target apparatus located in a same space as the holographic screen based on the operation position; and
- control the target apparatus based on the target operation, including:
  - based on the drag operation, displaying, on the holographic screen, a display content that is displayed by a screen of the terminal apparatus; or
  - based on the drag operation, displaying, on the screen of the terminal apparatus, a display content that is displayed by the holographic screen.

18. The storage medium of claim 17, wherein the processor is further configured to:
- obtain a line of sight position of a user; and
- match an apparatus position of an apparatus located in the same space with the holographic screen based on the operation position and the line of sight position to determine the target apparatus.

* * * * *